United States Patent [19]
Roth

[11] Patent Number: 5,833,857
[45] Date of Patent: Nov. 10, 1998

[54] MOBILE BIOREACTOR AND BIOGENERATOR

[75] Inventor: Stephen M. Roth, Lafayette, La.

[73] Assignee: Lytal Family Trust, Lafayette, La.

[21] Appl. No.: 893,219

[22] Filed: Jul. 15, 1997

Related U.S. Application Data

[63] Continuation of Ser. No. 663,332, Jun. 7, 1996, abandoned.

[51] Int. Cl.$^6$ ........................................................ C02F 3/06
[52] U.S. Cl. .......................... 210/610; 210/617; 210/747; 210/150; 210/241
[58] Field of Search ...................................... 210/610, 617, 210/747, 150, 151, 170, 241, 90

[56] References Cited

U.S. PATENT DOCUMENTS

| | | | |
|---|---|---|---|
| 4,582,606 | 4/1986 | Atkinson et al. | 210/151 |
| 4,992,174 | 2/1991 | Caplan et al. | 210/747 |
| 4,999,103 | 3/1991 | Bogart | 210/241 |
| 5,019,268 | 5/1991 | Rogalla | 210/617 |
| 5,217,616 | 6/1993 | Sanyal et al. | 210/617 |
| 5,618,411 | 4/1997 | Donner et al. | 210/150 |

FOREIGN PATENT DOCUMENTS 2538800   7/1984   France .

*Primary Examiner*—Christopher Upton
*Attorney, Agent, or Firm*—Robert N. Montgomery

[57] ABSTRACT

A mobile bioreactor/generator is disclosed comprising a vehicle for transporting the bioreactor/generators in pairs which may be connected in series or parallel. The bioreactor/generators is comprised of a microorganism, inoculated bead bed, which is less subject to stress than other such reactors and which may be left in a dormant state for long periods of time. In one embodiment the bioreactor/generator may be off-loaded from the transport vehicle and used as a single stand alone unit at a remote site or used in combination with one or more bioreactors having different microorganisms for treating waste effluent. The bioreactor/generators further utilize the microbes which remain in the reactor's discharge effluent, after passing through the bioreactor, as a treatment for hazardous waste in the earth by injecting such effluent into bore holes.

14 Claims, 7 Drawing Sheets

MOBILE BIOREACTOR AND BIOGENERATOR

BACKGROUND OF THE INVENTION

This is a continuation application of earlier filed application Ser. No. 08/663,332 filed Jun. 7, 1996 now abandoned.

1. FIELD OF THE INVENTION

This invention relates to an improvement in the biological method of treating waste water. More particularly it relates to a continuous flow, immobilized cell reactor and bioprocess, for the removal of volatile, toxic, organic compounds from contaminated, aqueous liquids and a method for the injection of bacteriological enzymes into organically contaminated soil for the purpose of detoxification.

2. GENERAL BACKGROUND

In general, the methods of treating waste water and the detoxification of organic contaminated liquids, sludge and soils are well known within the art.

A wide variety of microorganisms and environmental conditions have been developed for detoxifying various pollutants. It is well known that in order to maximize the efficiency of the biological treatment of waste water, it is necessary to provide a reactor and choose the proper microbes, depending on the type of pollutant to be treated, and provide suitable environmental conditions within the reactor which will enhance the microbial activity as well as increase the amount of microorganisms within the reactor.

Several methods have been developed in an attempt to enhance the activity of microorganisms in a closed environment. Most such reactors operate in batch mode whereby a fixed amount of the effluent, which has been pretreated and filtered, is pumped into a tank where a concentration of the particular microorganism is present or added to the effluent. The retention time is often determined by the concentration, type of enzyme and temperature of the mixture. Any variation of the environmental conditions creates stress on the bacteria, or if the concentration of the effluent itself changes drastically, it often results in loss of process control and down time. To remedy this problem, methods were developed such as that disclosed by Shin et al. in U.S. Pat. No. 5,254,254, whereby a floating, porous, biomass carrier can be mixed thoroughly with the waste water thereby enhancing the efficiency of the mass transfer without being affected greatly by shear stress of the fluid in the reactor.

Batch type reactors tend to be large vessels having circulatory capability wherein the bacteria is generally maintained in an efficient state as a result of the nutrients in effluent materials being feed thereto. Such systems are adequate for situations where the effluent can be delivered to the reactor or the reactor is built into the waste water treatment system.

Treatment systems are becoming necessary for use at small or temporary remote locations. It is becoming overly expensive to transport waste water to plants for treatment or to build a large facility on site to handle such treatment. Therefore, there is a need for a portable, high volume, highly efficient, versatile waste water treatment system. As a rule batch type systems do not lend themselves to portability.

A second type of bioreactor is one designed for high volume, continuous throughputs which utilize membranes or films. Again such reactors are usually large and cumbersome and are not candidates for portability.

Although bioreactors, such as immobilized cell reactors having high throughputs have been developed which could be made portable, they do have several drawbacks which make them very expensive to maintain and operate. Reactors such as that disclosed by Friday et al. in U.S. Pat. No. 5,211,848, utilizes a closed reactor, provided with biocatalyst constituted of specific adapted microbial strains immobilized and attached to an inert porous packing or carrier. The system disclosed by Friday seems to be efficient for a specific treatment situation, specifically halogenated organic compounds. There is no indication that the system is effective in treating aqueous waste under non-ideal, real world environments. Therefore, there is a need for a mobile, high flow through reactor having a highly efficient biocatalyst for treating a wide variety of hazardous aqueous waste.

SUMMARY OF THE PRESENT INVENTION

The present invention is a system which has been developed to meet the needs discussed above and overcome the drawbacks of the prior art. It has been discovered that a high volume bioreactor comprising an immobilized bed of highly efficient biocarriers which are dormant but can be made portable and brought into an active state by providing nutrients and sufficient oxygen during or after transport, is capable of treating a wide variety of aqueous waste without special prefiltration and is not subject to environmental stress factors normally associated with bioreactor systems. The bioreactor is further capable of sustaining a dormant microbial colonization in the biocarrier bed for years thus allowing the reactor to be activated on an as needed basis. The system does not rely on sensitive operating conditions; therefore, it is easy to maintain and can be operated by unskilled labor.

The present bioreactor utilizes a biocarrier structured of inorganic oxide matrices which are nontoxic and highly biocompatible. These biocarriers have a rough hydrophilic surface which promotes the adherence of microorganisms. The carrier's surface area and porosity facilitate dense colonization of the structure with microbial cells. The high surface area to volume ratios allow for a smaller reactor size while maintaining a faster throughput of waste. It is important that the biocarrier have a porosity factor which allows for internal colonization of the matrix. This allows a system up-set to dislodge only the biomass on the surface of the carrier. The interior cells serve as a reserve for rapid recolonization of the system. It is the cells ability to recolonize after severe stress which makes portability possible. The carrier matrix as used with the present bioreactor/generator is most often inoculated with one of the following bacteria: amylase, diastases, lipase, cellulase, and protease.

Under certain conditions the present reactor may be used as a biogenerator. When a hazardous fluid has been discharged and allowed to seep into the earth, bore holes may be drilled into the contaminated area thereby allowing fluids to be passed through the bioreactor and into the bore holes. The fluid, having been in contact with the bioreactor's biocarriers, strips away some of the bacteria which have been colonized in and on the surface of the carriers, thereby, fluiditly brought into contact with the hazardous waste material in the earth bore holes. Bioremediation then takes place within the earth. Therefore, the present invention may be considered as a bioreactor/generator.

It has been found that reactor size is important. When dealing with an unknown quantity of hazardous waste at a remote site with a portable bioreactor, it would not be practical to have multiple size reactors. Therefore, a transport vehicle capable of carrying two or more mid-size bioreactors, is therefore utilized whereby the reactors may be used independently, in parallel or in series. The vehicle is designed to provide all power, pumps, compressors, nutrient tanks, additive fluids and accessories necessary to cross connect and operate the reactors.

In some cases it may also become necessary to make a reactor self-sustaining in which case portable accessories are provided which will allow the reactor to be separated from the transport vehicle and operated as an independent reactor.

It is, therefore, an object of the present invention to provide a highly efficient, mobile, bioreactor unit which can be transported to a waste site for treatment of a variety of contaminates.

Another object of the present invention is to provided an economical, bioreactor system which can be operated by unskilled personnel.

Still another object of the invention is to provide mid-size bioreactors which can work in tandem, series or independently depending on the extent of contaminated waste at a site.

Yet another object is to provide a portable bioreactor having a biocarrier impregnated with a particular bacteria which can be easily exchanged depending on job requirement and which does not require constant maintenance.

BRIEF DESCRIPTION OF THE DRAWINGS

For a further understanding of the nature and objects of the present invention, reference should be had to the following detailed description, taken in conjunction with the accompanying drawings in which like parts are given like reference numerals, and wherein.

DESCRIPTION OF THE PREFERRED EMBODIMENT

Figure 1:
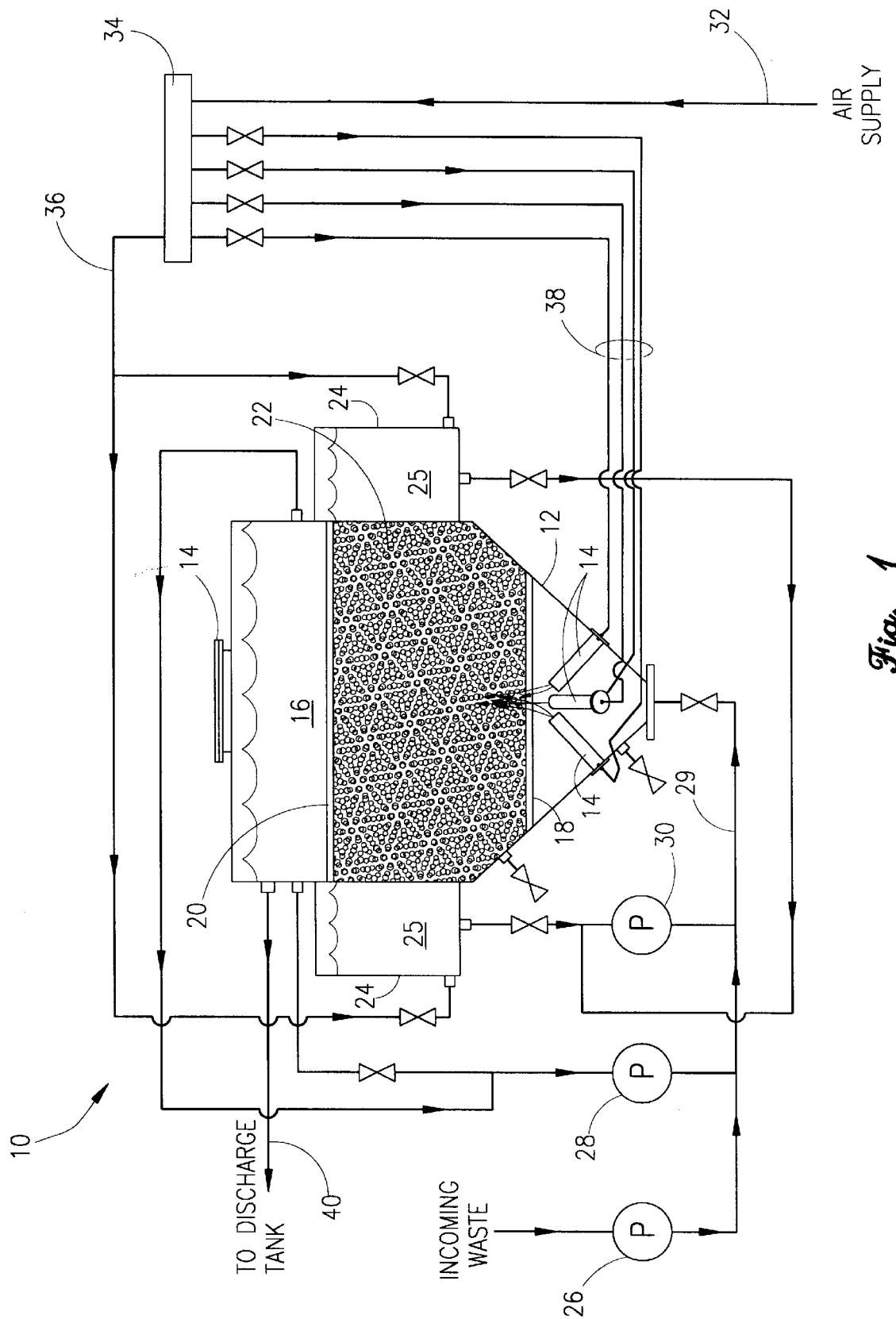
FIG. 1 is a vertical cross section view of the invention and its associated piping diagram.
Figure 7:
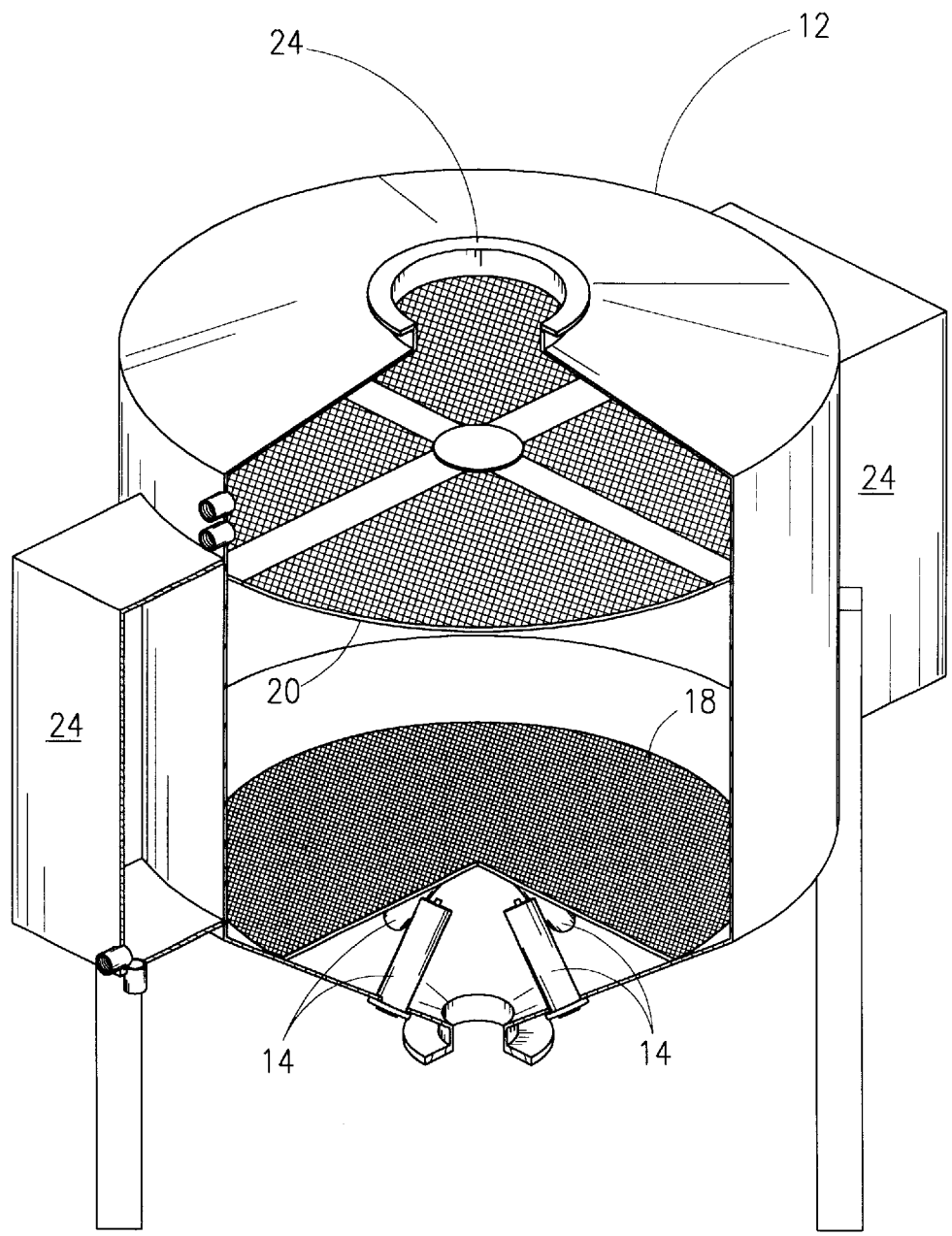
FIG. 7 is a partial sectioned, isometric, view of the bioreactor tank.

As depicted in FIG. 1, the bioreactor system 10 comprising a tank 12 having vertical side walls and a conical lower portion which is fitted with a discharge flange and a fluid inlet fitting and a man-way 14, located in its top portion. The tank 12 as best seen in FIG. 7, is divide into three compartments; upper, middle and lower. The lower compartment is fitted with diffuser type aerators 14 for introducing air into the waste liquid 16. The middle compartment comprising lower screen 18 and upper screen 20, also retains biocarrier beads 22, as seen in FIG. 1, which have been inoculated with a specific, cultivated bacteria. The beads are an inorganic oxide matrices which is nontoxic and highly biocompatible. The preferred biocarrier beads have thereby providing high cell densities on the carrier beads. A bed density is provided between 36 and 44 pounds per cubic foot. The preferred biocarrier is capable of sustaining microorganisms at pH levels between 2–12 for up to 24 hours with no loss in reactor performance. It is this high surface area to volume ratio which decreases the size of the bioreactor and results in faster throughput of waste. An upper screen 20 is provided to contain the bead bed and is configured with sliding, overlapping segments which allow them to be retracted one over the other to allow for easy access to the biocarrier beads 22. The reactor tank 11 is fitted with one or more nutrient tanks 24. Nutrient 25 is used to feed the bacteria present in the beads 22. Pumps 26, 28, & 30 are provided for circulating fluids into the tank 11.

Figure 2:
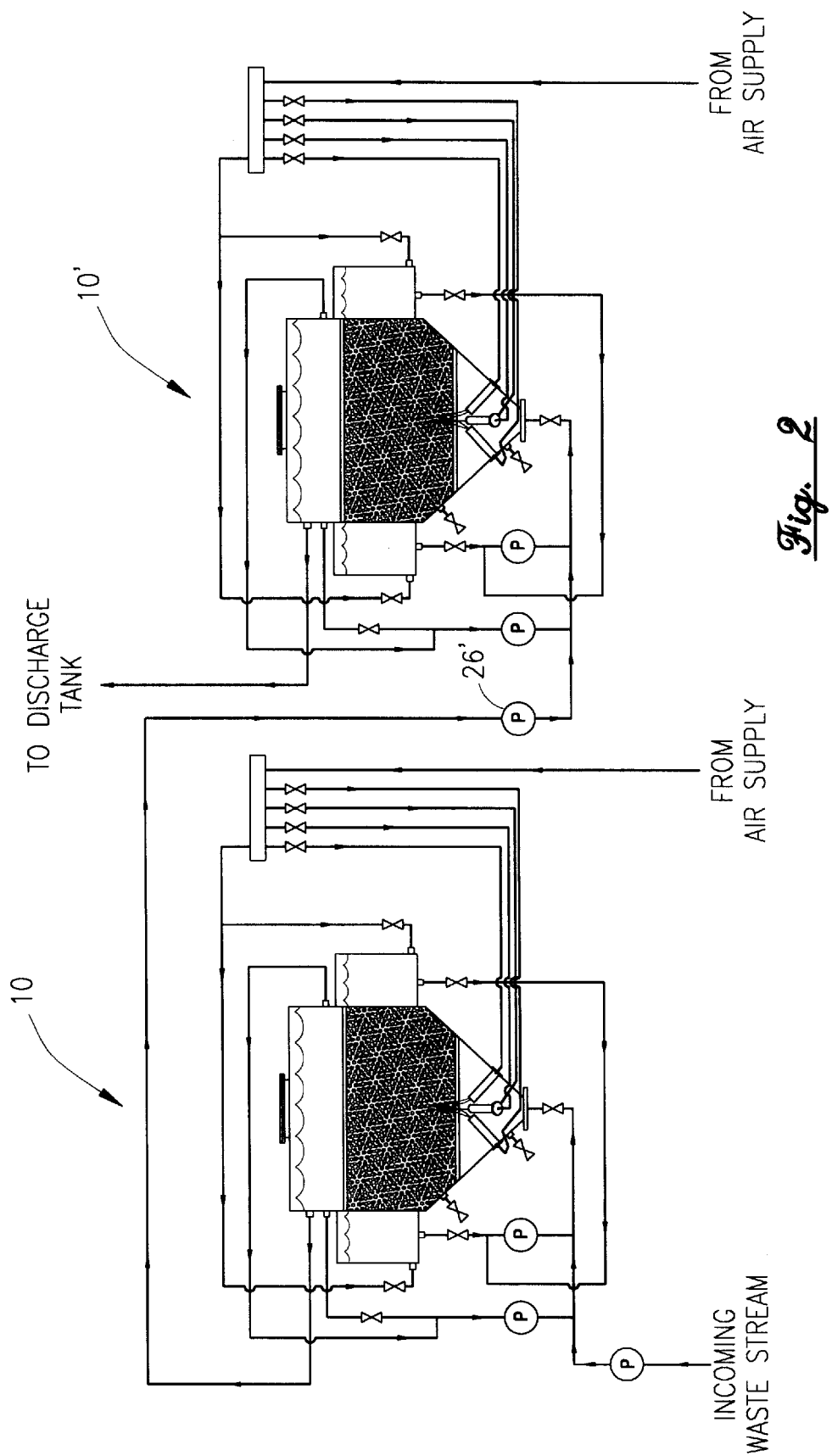
FIG. 2 is a vertical cross section of the invention and its associated piping diagram when two reactors are connected in series.

The system 10 further comprises a pressurized air supply 32 connected to a pressure manifold 34 where it is subdivided by a line 36 leading to the nutrient tanks 24 and additional lines 38 leading to the diffusion aerators 14. A pump 26 is provided to supply waste liquids 16 to the lower compartment of the tank via a connecting line 29 where it is aerated by incoming pressurized air through aerators 14. A recirculating pump 28 takes biologically active effluent 16 emanating from the biocarrier bead bed 22 and reintroduces it into the lower compartment via a connecting line 29 for remigration through the bead bed 22 when no incoming waste is present. A third pump 30 is provided for introducing nutrient 25 into the lower compartment via a connecting line 29 when no incoming waste is present, thereby, activating any dormant bacteria in the inoculated beads 22. A discharge line 40 is provided exiting the upper portion of the tank 11 for discharging treated waste liquid 16. The migration of a waste liquid 16 treated with sufficient air and nutrients, passing through a biological bed 22, containing an active bacteria colony, decontaminates the waste fluid stream. Activity of the microbes, leached from the surface of the beads 22 as the waste effluent passed through the bead bed and into the upper portion of the tank 11, continues to act on the waste stream 40 even after discharge. The basic bioreactor system 10, depicted in FIG. 1, is enhanced, as shown in FIG. 2, by connecting a second bioreactor system 10' in series thereby repeating the treatment process. In this case the discharge 40 from the system 10 is fed to the waste inlet pump 26' of the second bioreactor 10', thereby, doubling the reaction exposure time to the waste. It is equally possible to multiply this process as many times as necessary with two or more reactors having different bacteria for treating various components present within the waste stream. Multiple units may be interconnected in parallel to provide a system for treating larger volumes of waste effluent.

It is essential that biological units be as versatile as possible and be capable of meeting the needs of the waste site. Therefore, a biological system such as disclosed herein should be a stand alone system which can be operated in series or in tandem as mentioned.

Figure 3:
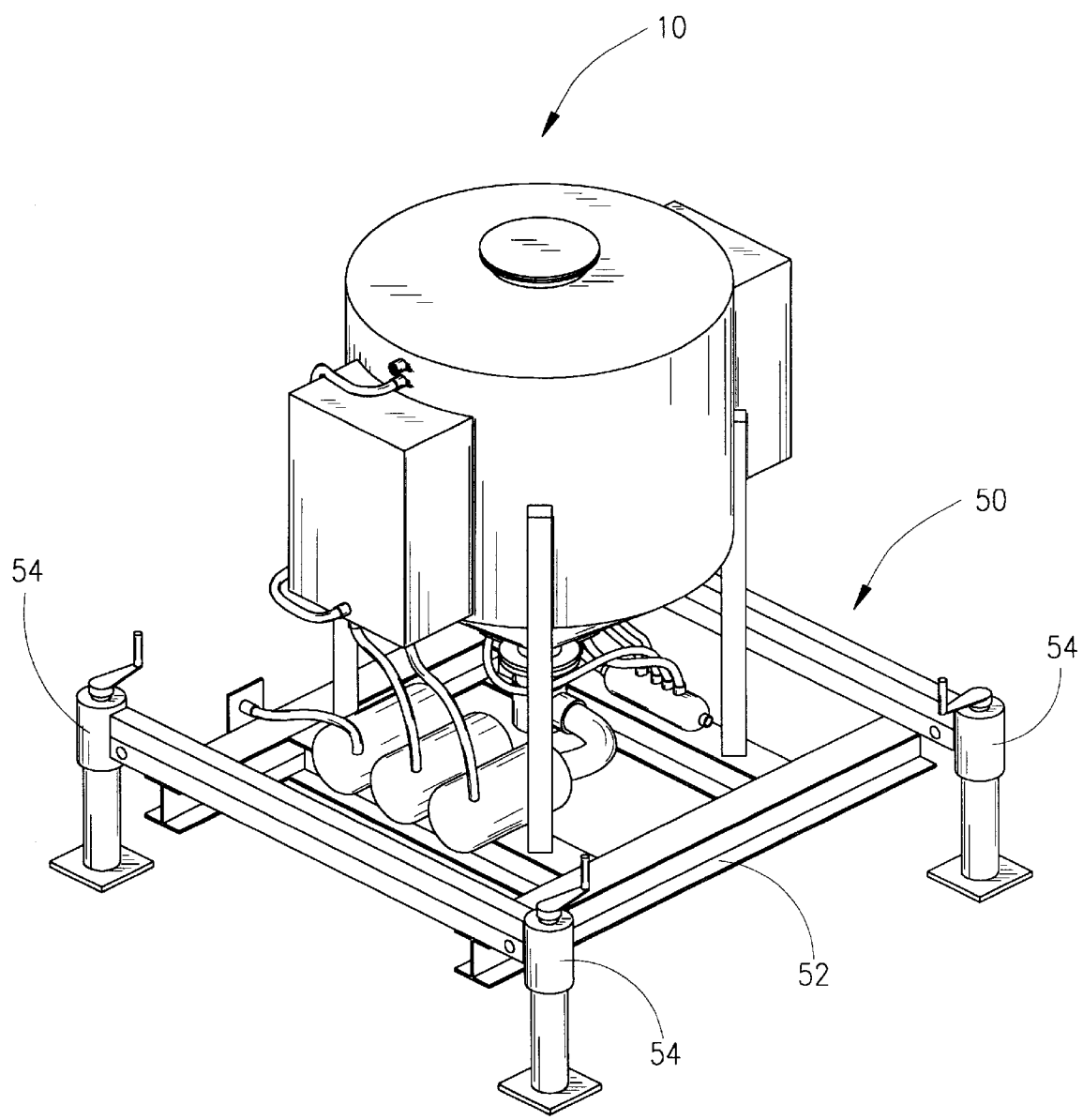
FIG. 3 is an isometric view of the invention structurally supported on a skid with leveling frame and jack system.

The system may be a skid arrangement, as seen in FIG. 3, having the biosystem, as disclosed above, adapted to a jack-up frame 50, comprised of a structural frame 52 and four jack-legs, 54 one located at each corner. The system may be connected to a power supply and high pressure air available at the site or may be connected to a portable power skid transported with the bioreactor.

Figure 4:
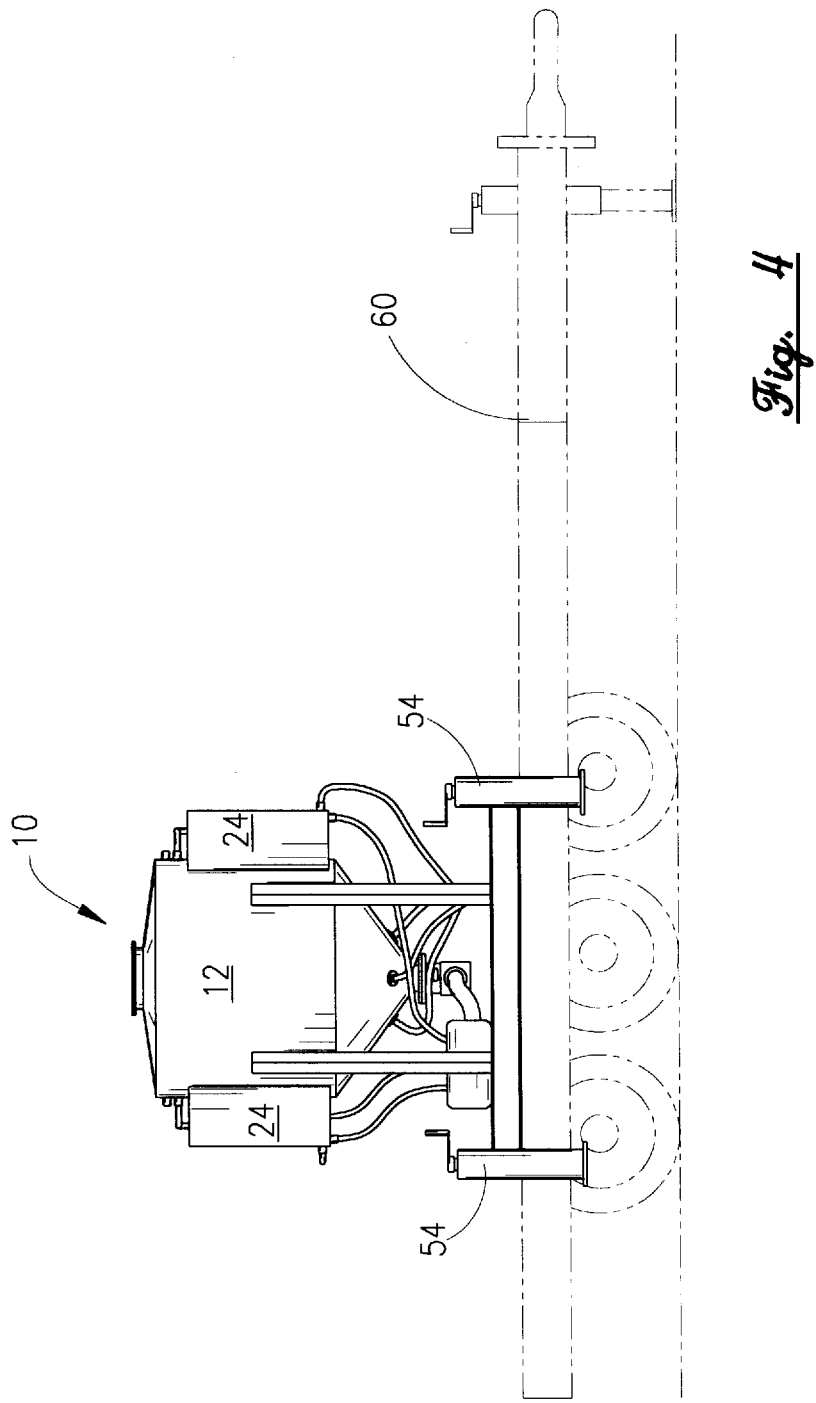
FIG. 4 is a side elevation of the bioreactor with leveling frame mounted on a utility trailer.
Figure 5:
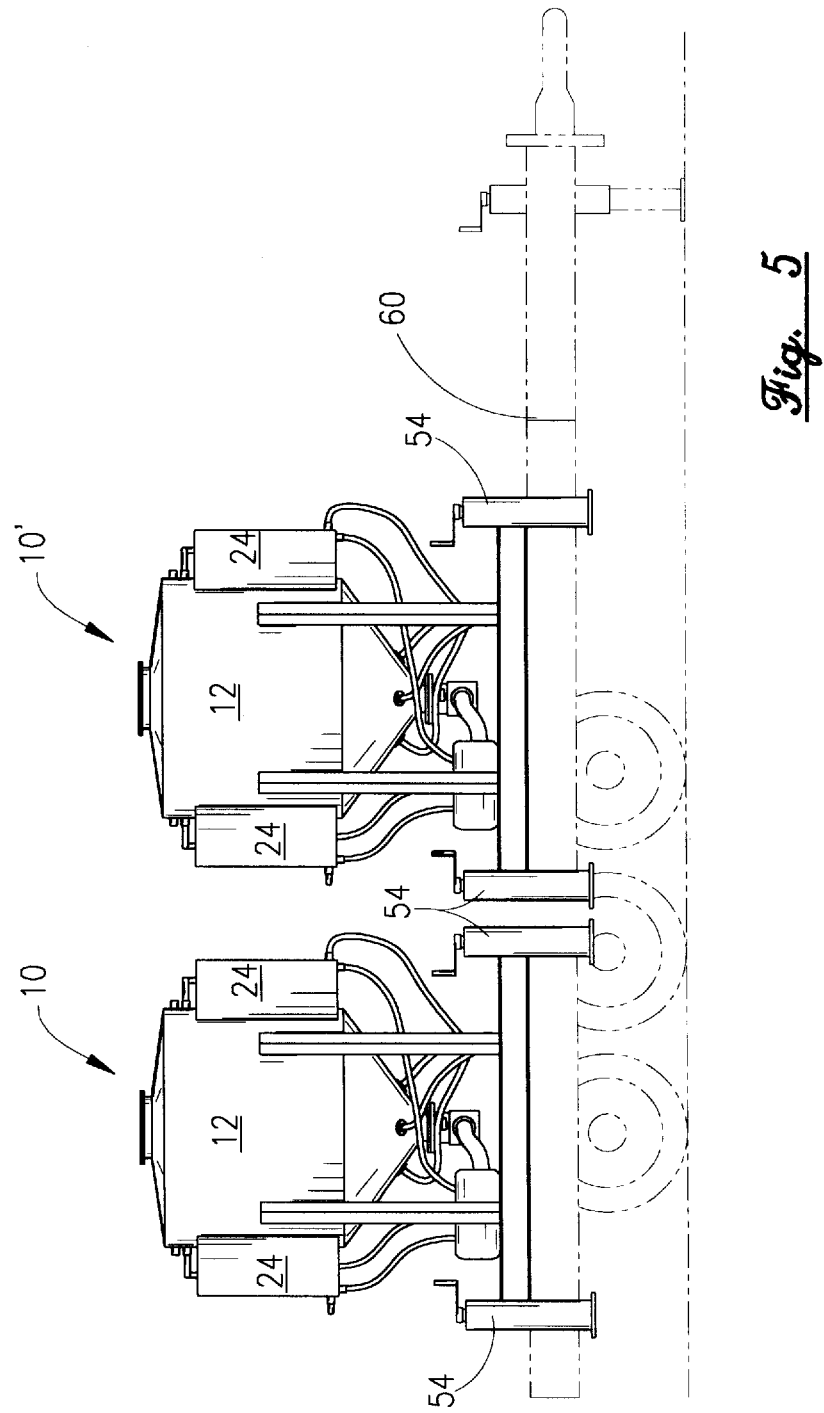
FIG. 5 is a side elevation of two bioreactors with leveling frames fitted to a utility trailer.
Figure 6:
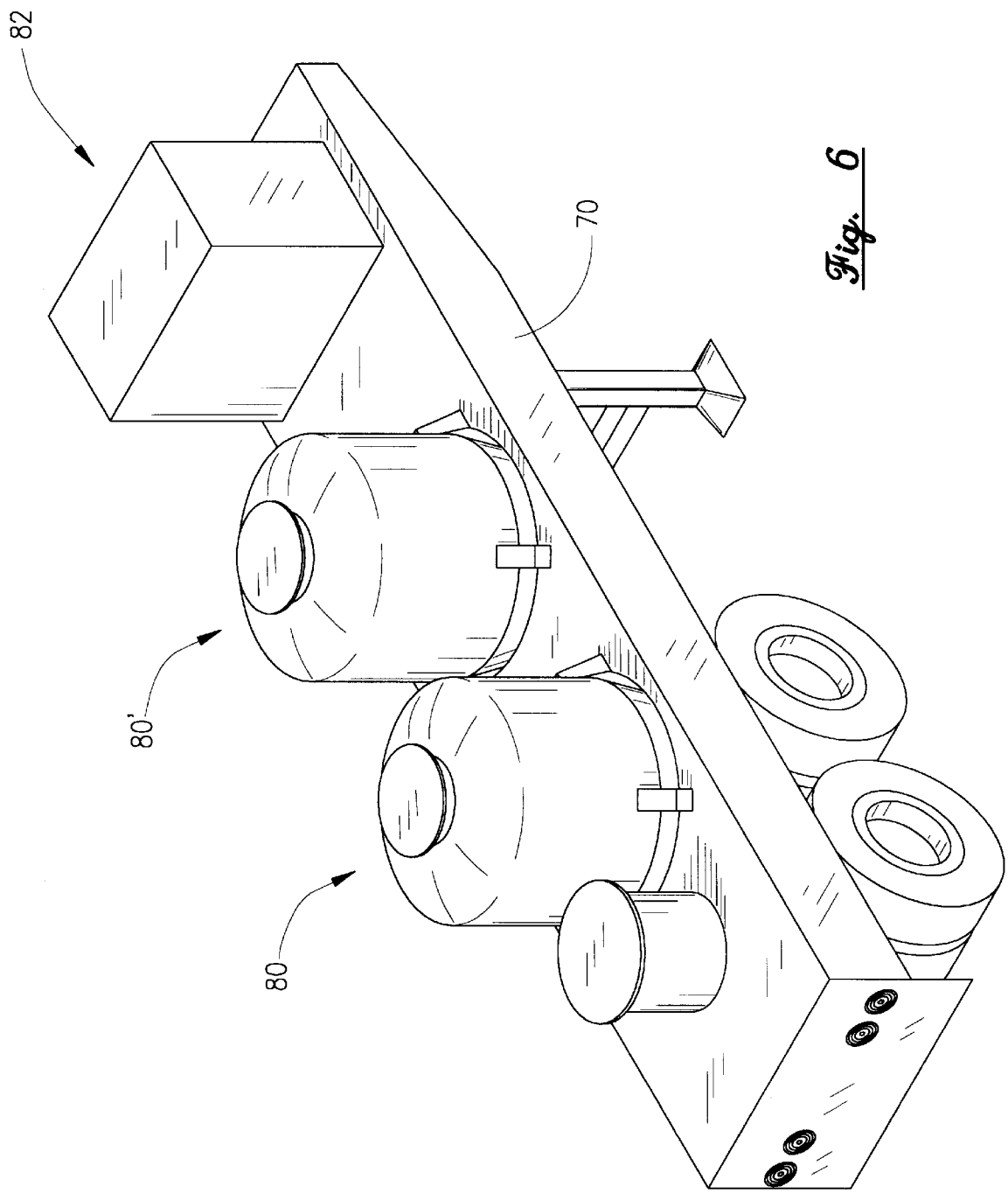
FIG. 6 is a isometric view of two bioreactor units as fitted integrally to a trailer.

The portable bioreactor is adapted for transport, as seen in FIG. 4, to a utility trailer 60 in a manner whereby the trailer 60 may be inserted under the bioreactor and the legs 54 retracted, thus, supported by the trailer 60. This arrangement may be utilized for two or more reactors, as seen in FIG. 5. In some cases the bioreactors 10, 10' may be used in combination, or one unit 10 may be left at one site while the second unit 10' is delivered to another. If both units are used in combination, two legs of each unit are extended thus providing stabilization for the trailer. Where only one unit is required, the legs 54 of the unit are extended, and the trailer 60 is then removed leaving the bioreactor unit 10 as a stand-alone system, as seen in FIG. 3. A second embodiment is shown in FIG. 6 in which a pair of bioreactor units are integral with a heavy duty trailer, in which case the two bioreactors are hard piped in a manner whereby they may be used in combination or separately through the use of valves, and the system is provided with a power unit 82 for the pumps 26–30 and high pressure air supply 32.

Because many varying and different embodiments may be made within the scope of the inventive concept herein taught and because many modifications may be made in the embodiments herein detailed in accordance with the descriptive requirement of the law, it is to be understood that the details herein are to be interpreted as illustrative and not intended to limit the invention.

What is claimed is:

1. A mobile system for bioremediation of aqueous, hazardous waste comprising:
   a) a vehicle;
   b) a bioreactor/generator removably connected to said vehicle in a manner whereby said vehicle is an integral part of said system, said bioreactor/generator comprising a substantially round, horizontal cross section and having a upper vertical wall portion and a contiguous lower portion of substantially parabolic-walled configuration, said bioreactor/generator further divided internally into upper, middle and lower chambers, having a liquid inlet, a nutrient inlet and a gas inlet into said lower chamber and a liquid outlet and a man-way into said upper chamber;
   c) an immobilized biocarrier bed located within said middle chamber contained by a an upper and lower screen; and
   d) a gas distribution means disposed within said lower chamber, connected to said gas inlet and including a plurality of diffusers for receiving a gas and distributing same into said biocarrier bed in the form of fine bubbles, said plurality of diffusers extending diagonally upwards towards said biocarrier bed.

2. A mobile system for bioremediation of aqueous, hazardous waste according to claim 1, wherein said immobilized biocarrier bed is comprised of a high porosity, inorganic matrices having porosity volume >0.5 cc/g and mean pore diameters of between 2 and 25 microns.

3. A mobile system for bioremediation of aqueous, hazardous waste, according to claim 2, wherein said inorganic matrices is inoculated with a microorganism chosen from the following group: amylase, diastases, lipase, cellulase, and protease.

4. A mobile system for bioremediation of aqueous, hazardous waste, according to claim 3, wherein said inoculated microorganisms in said matrices are capable of sustained life at pH levels between 2–12 for up to 24 hrs. with no loss in reactor performance.

5. A mobile system for bioremediation of aqueous, hazardous waste according to claim 2 where in said mean pore diameters are between 5 and 8 micron.

6. A mobile system for bioremediation of aqueous, hazardous waste, according to claim 1, wherein said bioreactor/generator is operational as a self-contained unit.

7. A mobile system for bioremediation of aqueous, hazardous waste, according to claim 1, wherein said bioreactor/generator is connected in parallel with another bioreactor/generator.

8. A mobile system for bioremediation of aqueous, hazardous waste, according to claim 1, wherein said bioreactor/generator is connected in series with other bioreactor/generators.

9. A mobile system for bioremediation of aqueous, hazardous waste, according to claim 1, wherein said bioreactor/generator is removably connected to a custom, utility, transport vehicle.

10. A mobile system for bioremediation of aqueous, hazardous waste, according to claim 1, wherein said bioreactor/generator is supported on a frame having jacking legs for raising said frame above said transport vehicle thus allowing said vehicle to be removed.

11. A mobile system for bioremediation of aqueous, hazardous waste comprising:
   a) a vehicle;
   b) a bioreactor/generator removably connected to said vehicle in a manner whereby said vehicle is removable from said system at a remote site, said bioreactor/generator comprising a substantially round, horizontal cross section and having an upper vertical wall portion and a contiguous lower portion of substantially parabolic-walled configuration, said bioreactor/generator further divided internally into upper, middle and lower chambers, having a liquid inlet, a nutrient inlet and a gas inlet into said lower chamber and a liquid outlet and a man-way into said upper chamber;
   c) an immobilized biocarrier bed comprised of high porosity, inorganic matrices, located within said middle chamber;
   d) a gas distribution means disposed within said lower chamber, connected to said gas inlet and including a plurality of diffusers for receiving a gas and distributing same into said biocarrier bed in the form of fine bubbles, said plurality of diffusers extending diagonally upwards towards said biocarrier bed;
   e) a nutrient tank connected to said nutrient inlet;
   f) a bacteria inoculated into said matrices, maintained in an active state with a nutrient supplied from said nutrient tank;
   g) a first pump means for supplying said aqueous hazardous waste to said liquid inlet;
   h) a second pump for recirculating said liquid from said upper chamber back to said lower chamber;
   i) a third pump means for injecting said nutrient into said aqueous, hazardous waste and into said bioreactor bed; and
   i) a gas supply for injection into said gas distribution means.

12. A method of bioremediation of aqueous, hazardous waste at remote sites with a mobile transport system comprising the steps of:
   a) transporting a biological reactor/generator, comprising a substantially round, horizontal cross section and having an upper vertical wall portion and a contiguous lower portion of substantially parabolic-walled configuration, said bioreactor/generator further divided internally into upper, middle and lower chambers having a liquid inlet, a nutrient inlet, and a gas inlet into said lower chamber and a liquid outlet and a man-way into said upper chamber;
   b) an immobilized biocarrier bed comprised of high porosity, inorganic matrices, located within said middle chamber;
   c) a gas distribution means disposed within said lower chamber connected to said gas inlet and including a plurality of diffusers for receiving a gas and distributing same into said biocarrier bed in the form of fine bubbles, said plurality of diffusers extending diagonally upwards towards said biocarrier bed;

d) a nutrient tank connected to said nutrient inlet;

e) a bacteria inoculated into said matrices, maintained in an active state with a nutrient supplied from said nutrient tank;

f) a first pump means for supplying said aqueous hazardous waste to said liquid inlet;

g) a second pump for recirculating said liquid from said upper chamber back to said lower chamber;

h) a third pump means for injecting said nutrient into said aqueous, hazardous waste and into said bioreactor bed;

i) a gas supply for injection into said gas distribution means;

j) activating said bacteria from a dormant state, prior to and during transport by circulating said nutrient and said gas through said biocarrier bed, thereby creating a bacteria rich liquid;

k) supplying said bioreactor/generator with said aqueous, hazardous waste; and l) discharging a bacteria laden effluent from said bioreactor.

13. A method of bioremediation of aqueous, hazardous waste at remote sites with a mobile transport system, according to claim 12, wherein said biological reactor/generator effluent discharge is injected into bore holes in the earth at a contaminated site.

14. A method of bioremediation of aqueous, hazardous waste at remote sites with a mobile transport system, according to claim 12, wherein said inoculated, immobilized biocarrier bed remains dormant but revivable after at least one year.

* * * * *